Sept. 19, 1939. J. L. PERKINS 2,173,660
GEARING
Filed June 4, 1937

INVENTOR.
Julian L. Perkins.
BY Walter C. Ross.
ATTORNEY.

Patented Sept. 19, 1939

2,173,660

UNITED STATES PATENT OFFICE 2,173,660

GEARING

Julian L. Perkins, West Springfield, Mass.

Application June 4, 1937, Serial No. 146,347

2 Claims. (Cl. 74—425)

This invention relates to improvements in gearing and is directed more particularly to improvements in worm gearing and support means therefor.

The principal objects of the invention are directed to improvements in gearing wherein a worm of novel form is rotatably mounted in a support in such a way that the worm and support constitute a unit which may be secured to a support so that the worm may mesh with a gear in such a manner that the gear and worm are related for the most efficient operation.

Various other novel features and advantages of the invention will be hereinafter more fully referred to in connection with the accompanying description wherein.

Figure 1:
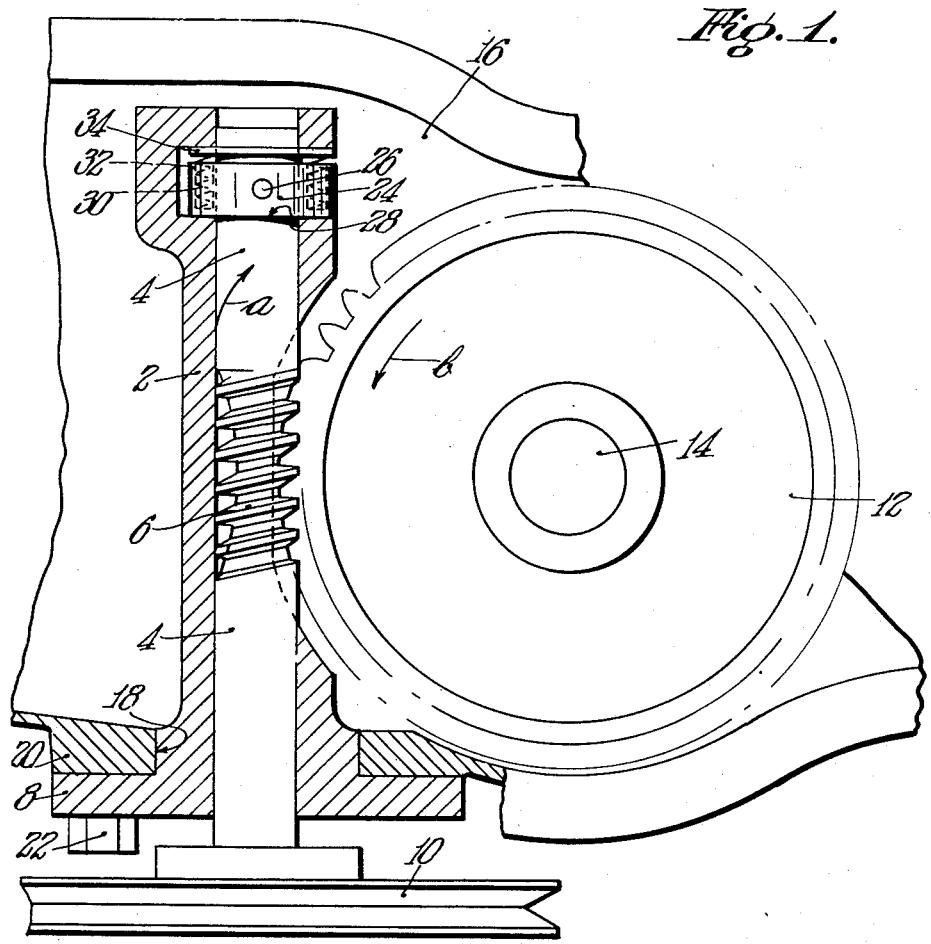
Fig. 1 is a partial plan and sectional view showing the novel features of the invention.

Referring now to the drawing more in detail, the invention will be fully described.

A bearing member 2 is provided and this is bored to receive for rotation a shaft 4 which, in turn, carries between its ends a worm 6. The bearing 2 has a flange, such as 8, and the shaft 4 may be driven by any suitable means, as by a belt in engagement with a pulley 10 thereon.

For purposes of description the shaft 4 will be referred to as a drive shaft and it is so arranged that as it rotates the worm 6 thereof is in mesh with a gear 12 and serves to rotate the said gear. The latter is associated with a shaft 14 which shaft may function to drive any desired apparatus or other gears which may be meshed with the gear 12.

A main support is represented by 16 and the shaft 14 is rotatable therein. The support 16 is also bored, as at 18, to receive the bearing 2 and said support has a bore 20 against which the flange 8 of the bearing may abut. The bearing 2 may be secured to this support 16 by any suitable means, such as by bolts 22 extending through the flange 8 and into the bore 20 of the said support 16.

With the shaft 4 rotating in the direction of the arrow a, the gear 12 will rotate in the direction of arrow b. In order to take up end thrusts, a collar 24 may be fixed to shaft 4, as by a pin or the like 26, and this collar is adapted to rotate against a shoulder 28 provided on the bearing 2. Springs 30 seated in sockets 32 of the collar bear against a washer 34 so as to yieldingly resist movements of the shaft upwardly in the position shown in Fig. 1.

In apparatus of the type to which the invention relates, it is important that the worm be located accurately with reference to the worm gear and that it be held for rotation without movement of its axis relative to the gear. To that end, the bearing 2 and worm shaft 4 constitute a unit which may be secured to the main support in such a manner that the worm is accurately related to the worm gear and held in that position.

Not only does this invention provide a worm and shaft arrangement which is economical to manufacture in that the worm threads are formed on a shaft, as distinguished from a worm which is usually of some larger diameter than the shaft or from a worm which is slipped onto and secured to the shaft, but, it will be noted, there are a plurality of threads provided on the worm shown between which are received a plurality of teeth of the worm gear. This provides a multiplicity of bearing surfaces between the gear and worm whereby the utmost efficiency may be obtained.

In assembling the parts, the bearing 2 is slipped through the opening in the main support and the worm is located in the correct position relative to the worm gear. Then it is secured in this desired position.

Figure 2:
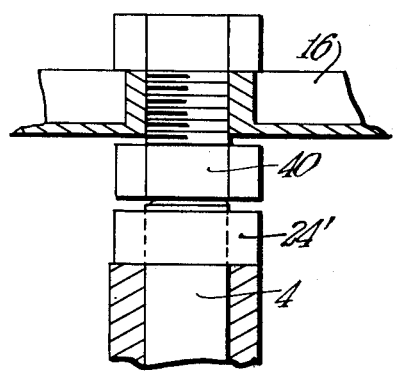
Fig. 2 is a partial plan view to explain a modified form of the invention.

It is very important for the most efficient operation that the horizontal line passing through the axis of worm gear 12 pass through the center of the worm and to this end the arrangement may be designed in some cases as shown in Fig. 2 to provide a longitudinal adjustable abutment for locating the worm accurately with respect to the gear.

An adjusting screw 40 is in threaded engagement with the main support 16 and a shaft 4' carrying a collar 24' on its end is arranged so that the end of the shaft abuts the adjusting member 40. By turning the adjusting member 40 in one direction or the other, the shaft 4' may be urged downwardly or allowed to move upwardly all to the end that a horizontal line through the axis of rotation of gear 12 will intersect the worm at the desired location.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A unitary gearing assembly for securing to a support and co-operating with a worm gear thereof comprising in combination, a bearing member for securing to said support having an axial bore therethrough, a drive shaft rotatable in the bore of said bearing member having an intermediate portion forming a worm, said bearing member provided with a transverse slot having spaced shoulders at the inner end intersecting said bore, a member fixed on said drive shaft in said slot abutting one of the shoulders for holding said drive shaft against axial movements in one direction and a spring means interposed between said member and the other of said shoulders to yieldingly resist movements of said drive shaft in an opposite direction, all adapted and arranged whereby the assembly may be secured as a unit to a support for holding the worm in mesh with the worm gear.

2. A gearing unit adapted to be secured to a support provided with an opening and having a rotatable worm gear therein comprising in combination, a bearing member adapted to extend through the opening in the support having an axial bore and a portion for abutting against said support, a drive shaft rotatable in the bore of said bearing member having a worm formed thereon intermediate the ends thereof providing bearings in the bore of said bearing member at opposite ends of the worm, the worm gear being mounted on a rotatable shaft, said bearing member being cut away at a side thereof exposing a side of the worm and permitting the worm to mesh with the worm gear, and a spring means associated with said shaft and said bearing member resisting axial movements of said shaft relative thereto in one direction, all adapted and arranged whereby the worm is held in meshing engagement with said gear.

JULIAN L. PERKINS.